(12) United States Patent
Sabherwal (10) Patent No.: US 12,496,602 B2
(45) Date of Patent: Dec. 16, 2025

(54) DOSING DEVICE WITH DOSING CAP

(71) Applicant: HALEON US Holdings LLC, Wilmington, DE (US)

(72) Inventor: Amit Sabherwal, Warren, NJ (US)

(73) Assignee: HALEON US Holdings LLC, Wilmington, DE (US)

( * ) Notice: Subject to any disclaimer, the term of this patent is extended or adjusted under 35 U.S.C. 154(b) by 132 days.

(21) Appl. No.: 18/257,458

(22) PCT Filed: Dec. 20, 2021

(86) PCT No.: PCT/US2021/064322
§ 371 (c)(1),
(2) Date: Jun. 14, 2023

(87) PCT Pub. No.: WO2022/140244
PCT Pub. Date: Jun. 30, 2022

(65) Prior Publication Data
US 2024/0033762 A1 Feb. 1, 2024

Related U.S. Application Data

(60) Provisional application No. 63/128,313, filed on Dec. 21, 2020.

(51) Int. Cl.
*B05B 11/10* (2023.01)
*B05B 11/02* (2023.01)
(Continued)

(52) U.S. Cl.
CPC ........ *B05B 11/1052* (2023.01); *B05B 11/028* (2023.01); *B05B 11/1069* (2023.01); *G01F 11/025* (2013.01); *G01F 15/005* (2013.01)

(58) Field of Classification Search
CPC ............... B05B 11/1052; B05B 11/028; B05B 11/1069; B05B 11/1067; G01F 11/025; G01F 15/005; B67D 7/18
See application file for complete search history.

(56) References Cited

U.S. PATENT DOCUMENTS 8,875,953 B2 * 11/2014 Corbin ............... B65D 47/2031
222/207
9,346,069 B2 * 5/2016 Holzmann .......... B05B 11/1084
(Continued)

OTHER PUBLICATIONS

International Search Report and Written Opinion Aug. 4, 2022 in International Application PCT/US2021/064322.

*Primary Examiner* — Donnell A Long
(74) *Attorney, Agent, or Firm* — E. Eric Mills; Nicholas P. Stadnyk; Maynard Nexsen PC (57) ABSTRACT

The present invention relates to a dosing device comprising: a container; and a dosing cap comprising: an inner portion provided over the container, wherein the inner portion includes an interior wall, an exterior wall, and a bottom surface; a piston, wherein a bottom surface of the piston is provided on top of the bottom surface of the inner portion; a skirt provided on an outer surface of the inner portion, wherein a top surface of the skirt comprises one or more high portions and one or more low portions; an outer portion rotatably coupled with the outer surface of the inner portion, wherein a bottom surface of the outer portion comprises one or more protrusions and one or more recesses, and wherein the outer portion is provided above the skirt along a vertical axis; and a head comprising an applicator surface and at least one orifice.

11 Claims, 9 Drawing Sheets

(51) Int. Cl.
    *G01F 11/02*     (2006.01)
    *G01F 15/00*     (2006.01)

(56) References Cited

U.S. PATENT DOCUMENTS

| | | | |
|---|---|---|---|
| 9,511,927 B1 * | 12/2016 | Schumacher | B65D 83/24 |
| 9,908,129 B2 * | 3/2018 | Hummel | B05B 11/1035 |
| 9,981,279 B2 * | 5/2018 | Edenilson | B65D 83/00 |
| 2017/0181523 A1 | 6/2017 | Jung | |
| 2018/0345305 A1 | 12/2018 | Wong et al. | |
| 2020/0290793 A1 | 9/2020 | Driskell | |
| 2020/0376509 A1 * | 12/2020 | Lee | B05B 11/1059 |

* cited by examiner

DOSING DEVICE WITH DOSING CAP

CROSS-REFERENCE TO RELATED APPLICATIONS

The present application is a U.S. National Phase Application under 35 U.S.C. § 371 of International Application PCT/US2021/064322, filed on Dec. 20, 2021, which claims the benefit of priority to U.S. Provisional Patent Application 63/128,313, filed on Dec. 21, 2020, both of which are incorporated herein by reference in their entireties.

FIELD OF THE INVENTION

Aspects of the present invention are directed to a dosing device including a container and a dosing cap for reliably dispensing a predetermined amount of contents from the container.

BACKGROUND

Containers provide a hygienic and convenient way to dispense contents contained within the container. Such containers are readily used with pharmaceuticals, cosmetics, and the food industry. In a conventional stock container, the amount of contents that is dispensed may not be the correct dose for the contents held in the container. Thus, the amount of contents dispensed may not be appropriate for the user's needs, resulting in waste or misuse of the contents and an inconvenient user experience.

Containers to dispense the exact amount of contents required per dose may need to be customized and designed specifically for the contents, preventing the use of stock containers which are readily available. Further, such customized containers are often bulky and incorporate a complicated mechanism. Such containers may be expensive to manufacturing resulting in an increased end cost for the user.

Based on the concerns noted above, a dosing device to dispense a predetermined amount of contents including a dosing cap with a simple construction that may be operably fitted with stock containers is highly desirable.

SUMMARY

Aspects of the present invention are directed to a dosing device comprising: a container having a top longitudinal end, a bottom longitudinal end, and a side wall, the top longitudinal end providing access to a cavity wherein contents can be held; and a dosing cap comprising: an inner portion provided over the top longitudinal end of the container, wherein the inner portion includes an interior wall, an exterior wall, and a bottom surface; a piston provided within the interior wall of the inner portion, wherein a bottom surface of the piston is provided on top of the bottom surface of the inner portion; a skirt provided on an outer surface of the inner portion, wherein a top surface of the skirt comprises one or more high portions and one or more low portions; an outer portion rotatably coupled with the outer surface of the inner portion, wherein a bottom surface of the outer portion comprises one or more protrusions and one or more recesses, and wherein the outer portion is provided above the skirt along a vertical axis; and a head cover provided over a top surface of the outer portion, the head cover comprising an applicator surface and at least one orifice, wherein the head cover is operably connected to the outer portion and the piston, and wherein the head cover, the outer portion, and the piston constate a moveable member.

Aspects of the invention are directed to the outer portion comprising two protrusions and two recesses arranged in an alternating order around the outer portion. Aspects of the present invention are further directed to the skirt comprising two high portions and two low portions arranged in an alternating order around the skirt.

Aspects of the invention are directed to the outer portion that is rotated during an operational cycle from an initial position, to an extended position, and back to the initial position to dispense contents from the container, and wherein the rotation of the outer portion from the initial position to the extended position constitutes a filling portion of the operational cycle and the rotation of the outer portion from the extended position back to the initial position constitutes a dispensing portion of the operational cycle. Aspects of the invention are further directed to a complete operational cycle including rotating the outer portion 180° relative to the vertical axis, whereby the first 90° rotation of the operational cycle is the filling portion of the operational cycle and the subsequent 90° rotation of the operational cycle is the dispensing portion of the operational cycle.

Aspects of the invention are directed to the high portions of the skirt being provided in the recesses of the outer portion and the protrusions of the outer portion being provided in the low portions of the skirt in the initial position, whereby the bottom surface of the outer portion is substantially flush against the top surface of the skirt in the initial position. Aspects of the invention are further directed to the protrusions of the outer portion being provided over the high portions of the skirt and the recesses of the outer portion being provided over the low portions of the skirt in the extended position, whereby the outer portion is extended upwards from the initial position.

Aspects of the invention are directed to the filling portion of the operational cycle including the moveable member moving up in the vertical directing creating a volume accumulation chamber between the piston and the bottom surface of the inner portion, wherein the volume accumulation chamber is a vacuum, and wherein contents are drawn from the container into the volume accumulation chamber. Aspects of the invention are further directed to the dispensing portion of the operational cycle including the moveable member moving down in the vertical direction and the piston occupying the space of the volume accumulation chamber, whereby contents are pushed or forced out of the volume accumulation chamber and dispensed out of the orifice.

Aspects of the present invention are directed to a method of dispensing a consistent and predetermined dose of contents. Aspects of the invention are further directed to between about 0.5 grams and about 5 grams of contents being dispensed from the dosing device with each operational cycle.

Aspects of the present invention are directed to a dosing cap comprising: an inner portion provided over a cavity of a container, wherein contents may be held in the cavity, and wherein the inner portion includes an interior wall, an exterior wall, and a bottom surface; a piston provided within the interior wall of the inner portion, wherein a bottom surface of the piston is provided on top of the bottom surface of the inner portion; a skirt provided on an outer surface of the inner portion, wherein a top surface of the skirt comprises at least one high portion and at least one low portion; an outer portion rotatably coupled with the outer surface of the inner portion, wherein a bottom surface of the outer portion comprises at least one protrusion and at least one recess, and wherein the outer portion is provided above the skirt along a vertical axis; and a head cover provided over a top surface of the outer portion, the head cover comprising an applicator surface and at least one orifice, wherein the head cover is operably connected to the outer portion and the piston, and wherein the head cover, the outer portion, and the piston constate a moveable member.

DETAILED DESCRIPTION

FIGS. 1-9D are based upon engineering drawings used for the development and representation of a dosing device and represent various embodiments of the present invention. Hence, the drawings are to scale and representative of the geometry of the dosing device.

FIGS. 1-7 illustrate an exemplary novel dosing device 10 according to an embodiment. Aspects of the present invention are directed to a dosing device 10 including a dosing cap 100, and a container 200. The dosing cap 100 dispenses a pre-determined and consistent amount of contents 127 from the container 200 with each operational cycle. This allows users to conveniently use the correct dose of contents 127, preventing misuse of contents and waste. The dosing device 10 may further comprise an optional cover 300 that may be provided over the dosing cap 100 to protect the dosing cap 100 from environmental factors and contamination.

Figure 1:
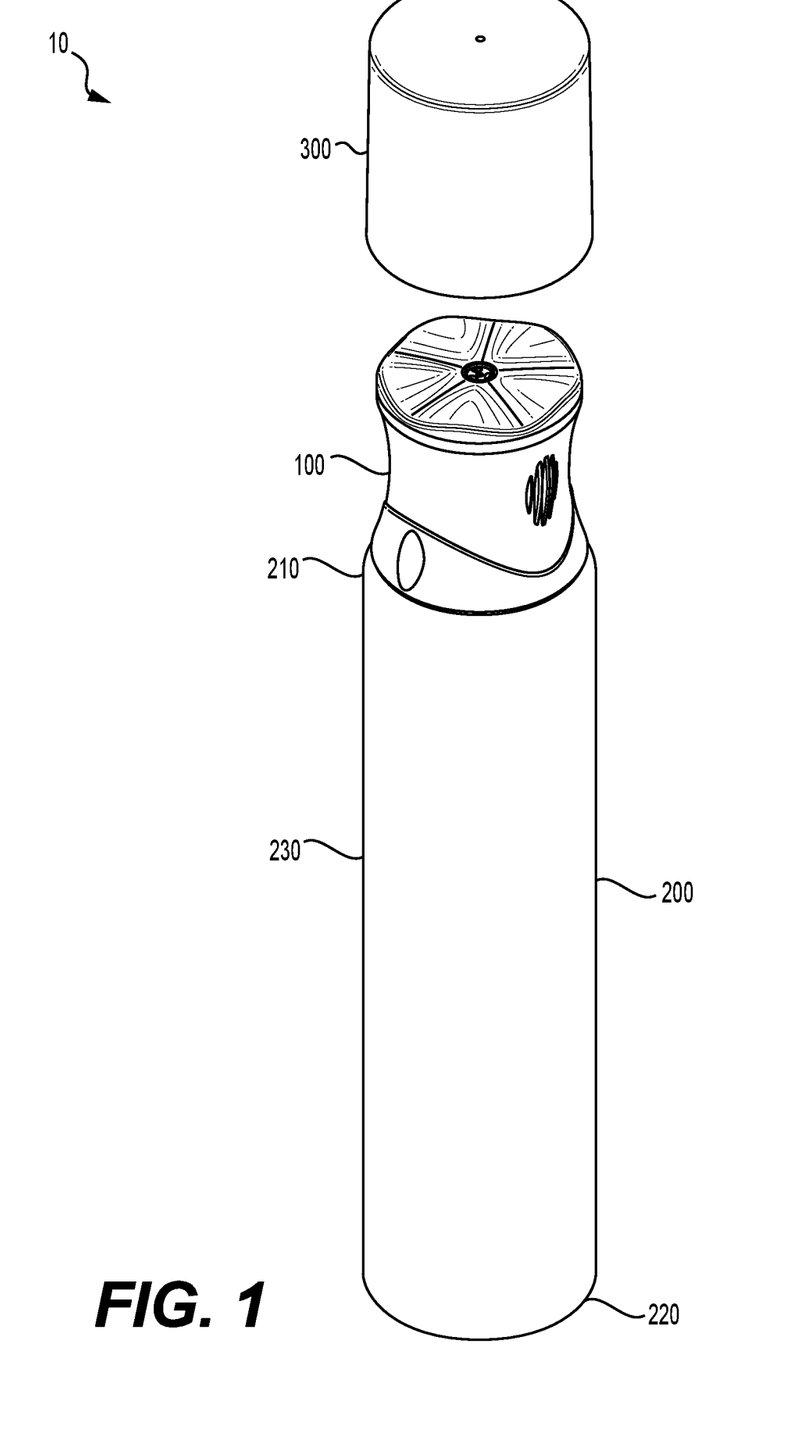
FIG. 1 is a perspective view of a dosing device according to an embodiment.

The container 200 may generally be a cylindrical member with a longitudinal axis and two ends such that the dosing cap 100 is attached to a top longitudinal end 210 of the container 200. The container 200 may be see through or opaque. The top longitudinal end 210 of the container 200 provides access to a cavity defined by a side wall 230 and a bottom longitudinal end 220 of the container 200. Contents 127 may be held in the cavity. In an embodiment, the container 200 may be a flexible tube. In another embodiment, the container may be rigid.

Figure 2:
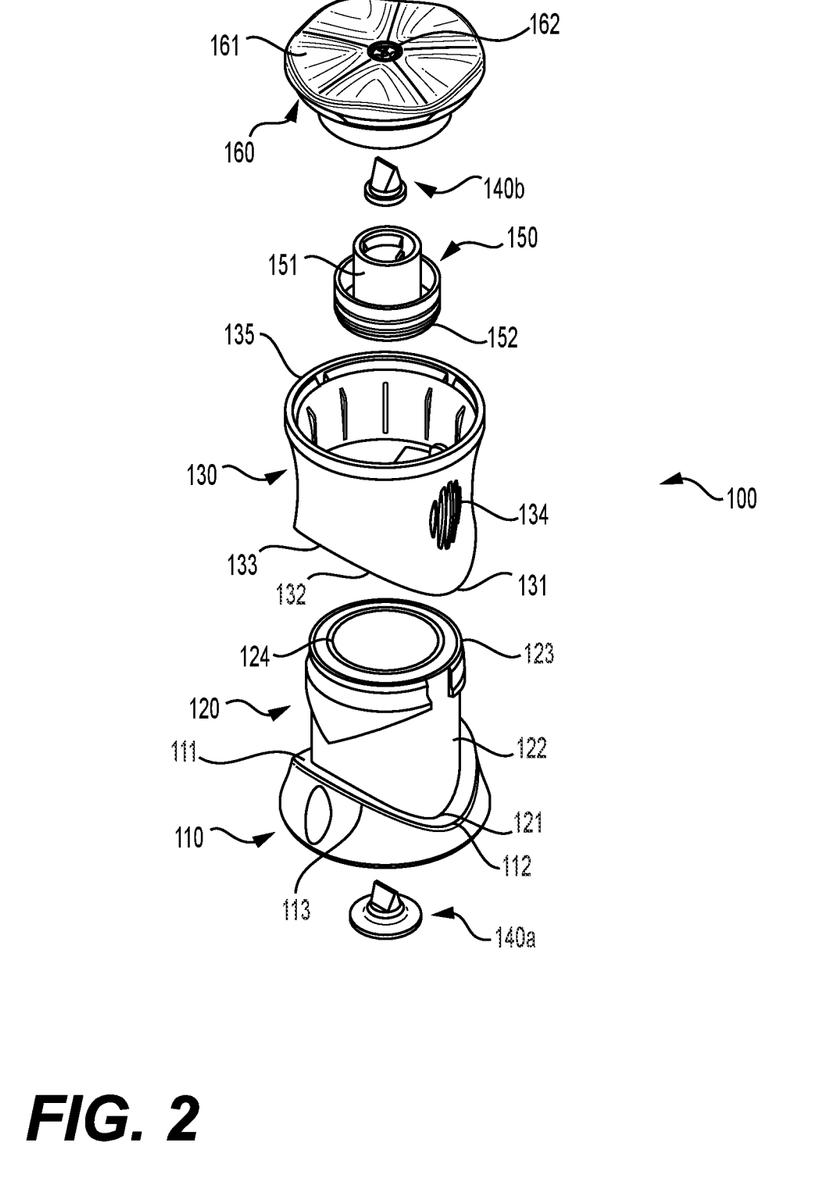
FIG. 2 is an exploded view of a dosing cap according to an embodiment.

FIG. 2 illustrates an exploded view of the dosing cap 100 according to an embodiment. The dosing cap 100 comprises a tubular inner portion 120 which may be fixed to the top longitudinal end 210 of the container 200 to connect the dosing cap 100 to the container 200. The inner portion 120 may be connected to the top longitudinal end 210 of the container 200 either integrally or non-integrally. If the inner portion 120 is integrally connected to the container 200, the inner portion 120 and the container 200 may be formed of a blow-molded material or injection molded using methods known to one skilled in the art. If the inner portion 120 and the container 200 are non-integrally connected, then they may be connected, for example, by being screwed on to external or internal threads, snap fitted, sized so as to provide a friction fit, or by any suitable manner known in the art. In a preferred embodiment, the inner portion 120 is connected to the top longitudinal end 210 of the container 200 so as to create an airtight and/or moisture tight seal. In an embodiment, the inner portion 120 may be compatible with standard stock containers so as to transform any container into a dosing device 10.

The inner portion 120 further comprises a skirt 110 in the shape of a wave provided externally around a bottom 121 of the inner portion 120. In an embodiment, the skirt 110 is provided continuously around the entire bottom 121 periphery of an outer surface 122 of the inner portion 120 and variably extends up along a vertical axis. In an embodiment, the skirt 110 is formed integrally with the outer surface 122 of the inner portion 120 so as to constitute a single piece. In another embodiment, the skirt 110 is permanently attached to the outer surface 122 of the inner portion 120 by any means known in the art.

In an embodiment, the skirt 110 includes one or more high portions 111 and one or more low portions 112, wherein the high portions 111 extend up higher along the vertical axis than the low portions 112 and have a height that is greater than a height of the low portions 112. In a preferred embodiment, the skirt 110 includes two high portions 111 and two low portions 112 provided in an alternating order around the skirt 110. In a preferred embodiment, the two high portions 111 oppose one another, and the two low portions 112 oppose one another. A top surface 113 of the skirt 110 provides a smooth and continuous transition between the high portions 111 and the low portions 112 around the entirety of the skirt 110.

The dosing cap 100 further comprises an outer portion 130 which is rotatably coupled with the inner portion 120. The outer portion 130 is mounted externally on the outer surface 122 of the inner portion 120 and is generally a cylindrical sleeve that is rotatable. In an embodiment, the outer portion 130 is rotatable about the vertical axis and is rotated by a user during the operational cycle to engage the dosing cap 100 to dispense contents from the container 200. The outer portion 130 is provided above the skirt 110 along the vertical axis.

In an embodiment, a bottom surface 133 of the outer portion 130 may be a wave shape. In an embodiment, the wave of the outer portion 130 corresponds to the wave of the skirt 110. The outer portion 130 comprises one or more protrusions 131 and one or more recesses 132, wherein the protrusions 131 have a length from a top 135 of the outer portion 130 that is greater than the length of the recesses 132. In a preferred embodiment, the bottom surface 133 of the outer portion 130 includes two protrusions 131 and two recesses 132 provided in an alternating order around the outer portion 130. In a preferred embodiment, the two protrusions 131 oppose one another, and the two recesses 132 oppose one another around the outer portion 130. The bottom surface 133 of the outer 130 portion provides a smooth and continuous transition between the protrusions 131 and the recesses 132 around the entirety of the outer portion 130. The outer portion 130 may be rotated during the operational cycle, whereby the bottom surface 133 of the outer portion 130 moves along the top surface 113 of the skirt 110 causing the outer portion 130 to move in the vertical direction from an initial position, up to an extended position, back to the initial position during the operational cycle.

The dosing cap 100 further comprises a piston 150 and a head cover 160. The piston 150 is provided within the inner portion 120. In an embodiment, the piston 150 has a tubular top portion 151 and a circular bottom portion 152. The head cover 160 is provided over the top 135 of the outer portion 130 and comprises an applicator surface 161 including an orifice 162 from which contents 127 may be dispensed and applied directly to the desired area or taken on a finger and applied to the desired area. In an embodiment, the applicator surface 161 is smooth and substantially flat. In another embodiment, the applicator surface 161 is textured. In an embodiment, the applicator surface 161 includes round bumps. In another embodiment, the applicator surface 161 includes ripples. In another embodiment, the applicator surface 161 is a dome to prevent the dispensed contents from re-entering the orifice 162. In an embodiment, the applicator surface 161 includes a sponge material or is made from a sponge material or equivalent absorbent material to allow the contents 127 to be soaked into the applicator surface 161 and applied directly to the desired area.

The orifice 162 includes at least one opening provided near the center of the applicator surface 161. In an embodiment, the orifice 162 may include more than one opening provided in a group near the center of the applicator surface 161 so as to diffuse the contents as they are dispensed. In an embodiment, the orifice 162 includes between 3 and 8 openings.

In an embodiment, the piston 150, head cover 160 and outer portion 130 are connected and operably coupled together. Specifically, the outer portion 130 is connected to the head cover 160 and the head cover 160 is connected to the piston 150. In an embodiment, the piston 150, head cover 160, and outer portion 130 move as a single unit during the operational cycle and constitute a moveable member 400.

A lower valve 140a and an upper valve 140b may be provided in the dosing cap 100 to control the flow of contents 127 from the container 200, into the dosing cap 100, and out of the orifice 162. The lower valve 140a and the upper valve 140b alternate independently between an open position and a closed position throughout the operational cycle. In an embodiment, the lower valve 140a and upper valve 140b may be one-way valves, two-way valves or a combination thereof. The lower valve 140a and the upper valve 140b may be any suitable shape and size. In an embodiment, the lower valve 140a and the upper valve 140b may be a triangular shape, spherical, an inverted triangular shape, a duckbill shape, or any combination thereof. The lower valve 140a is provided between the top longitudinal end 210 of the container 200 and the inner portion 120, and the upper valve 140b is provided between the piston 150 and the head cover 160. The lower valve 140a controls the flow of contents from the container 200 into the dosing cap 100, and the upper valve 140b control the flow of contents from the dosing cap 100 on to the applicator surface 160 via the orifice 162.

Figure 3:
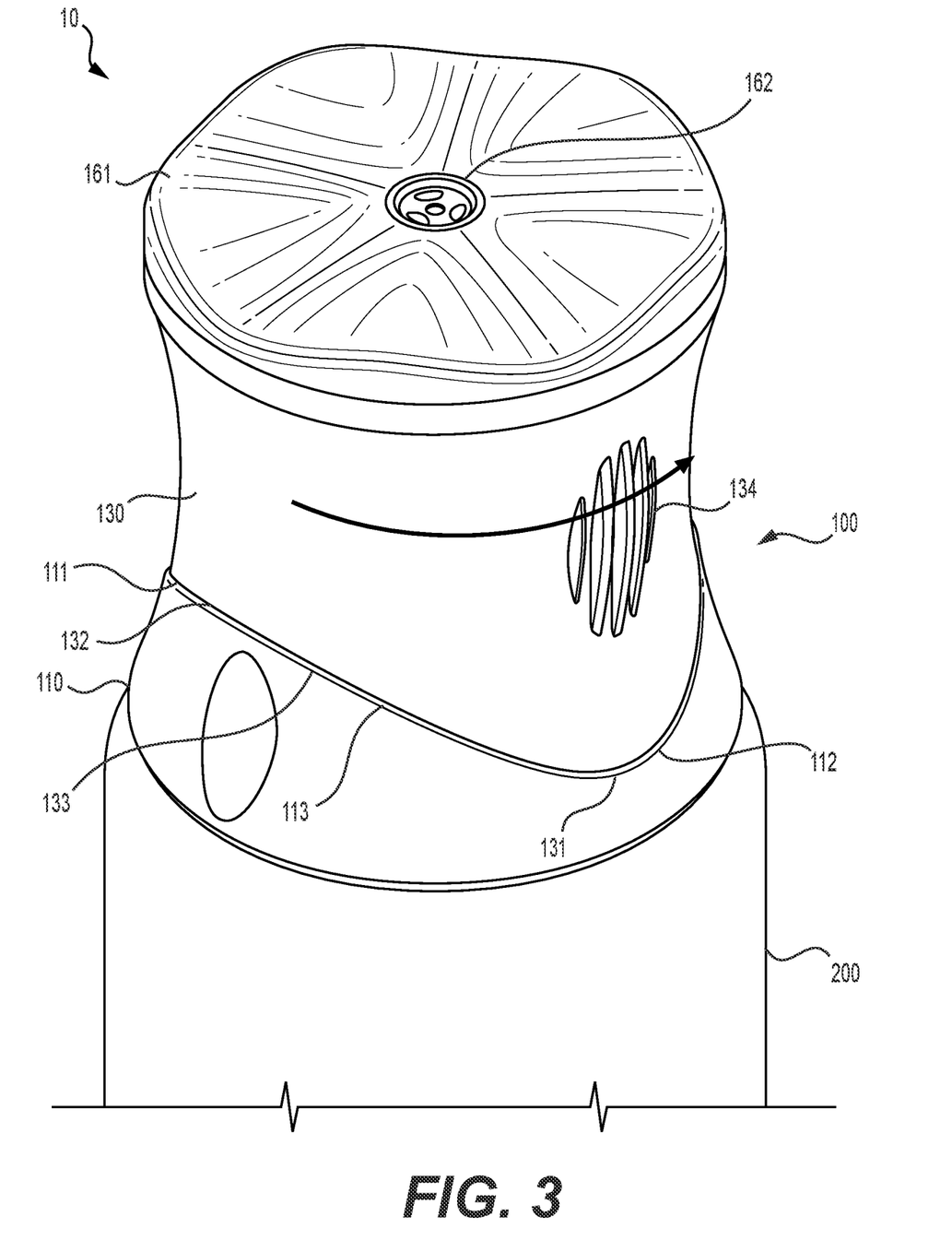
FIG. 3 is a perspective view of the dosing device in an initial position according to an embodiment.

FIG. 3 illustrates a perspective view of the dosing device 10 in an initial position. In the initial position, the protrusions 131 of the outer portion 130 are accommodated in the low portions 112 of the skirt 110, and the high portions 111 of the skirt 110 are accommodated in the recesses 132 of the outer portion 130. In this arrangement, the bottom surface 133 of the outer portion 130 is substantially flush against the top surface 113 of the skirt 110 such that there generally is continuous contact between the surfaces around the entire periphery of the dosing cap 100 with substantially little or no gaps between the two surfaces. In the initial position, contents are not being dispensed from the container 200 and the dosing cap 100 is not engaged. In the initial position, the top valve 140b and the bottom valve 140a are both in the closed position.

FIGS. 4A to 4D illustrate a perspective view of an exemplary operational cycle of the dosing device 10. In order to dispense contents from the container 200 through the dosing cap 100, a user may rotate the outer portion 130 around the vertical axis from the initial position, to the extended position, back to the initial position such that the bottom surface 133 of the outer portion 130 moves along the top surface 113 of the skirt 110. A complete operational cycle includes rotating the outer portion 130 180° relative to the vertical axis, whereby the first 90° rotation is a filling portion of the operational cycle and the subsequent 90° rotation is a dispensing portion of the operational cycle.

During the filling portion, the outer portion 130 moves up along the wave of the top surface 113 of the skirt 110 and moves up in the vertical direction to the extended position from the initial position. During the dispensing portion, the outer portion 130 moves down along the wave of the top surface 113 of the skirt 110 and moves down from the extended position back to the initial position. Grips or textured portions 134 may be provided on the outer portion 130 to aid the user in gripping and easily rotating the outer portion 130. At the completion of the operational cycle, contents may be dispensed from the container 200 and provided on the applicator surface 161 ready for use.

Figure 4A:
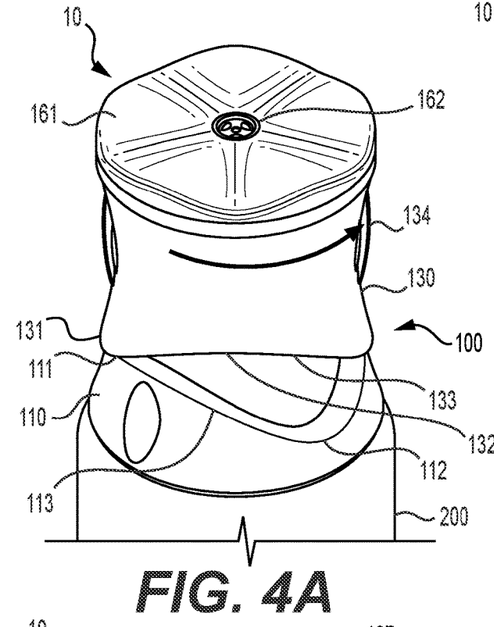
FIGS. 4A-4D illustrate a perspective view of an exemplary operational cycle of the dosing device according to an embodiment.
Figure 4B:
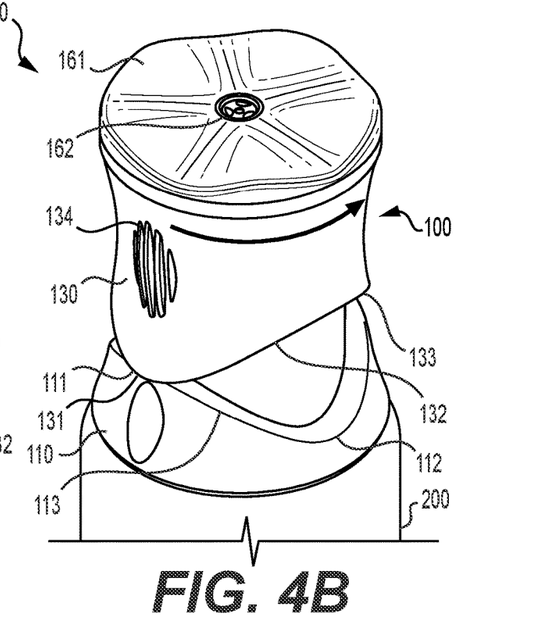

FIGS. 4A and 4B depict the filling portion of the operational cycle. FIG. 4A illustrates a first step of the operational cycle, whereby the outer portion 130 is rotated about 45° relative to the vertical axis from the initial position. During this rotation, the outer portion 130 begins to move up in the vertical direction from the initial position as the bottom surface 133 of the outer portion 130 moves along the top surface 113 of the skirt 110 such that the protrusions 131 of the outer portion 130 move towards the top portions 111 of the skirt 110. FIG. 4B illustrates a second step in the operational cycle, whereby the outer portion 130 is rotated an additional about 45° relative to the vertical axis for a total of about 90° from the initial position. At this position, the protrusions 131 of the outer portion 130 are directly over the top portions 111 of the skirt 110 and the recesses 132 of the outer portion 130 are directly over the low portions 112 of the skirt 110 such that the outer portion 130 is at the highest position in the operational cycle and the outer portion 130 is in the extended position.

Figure 4C:
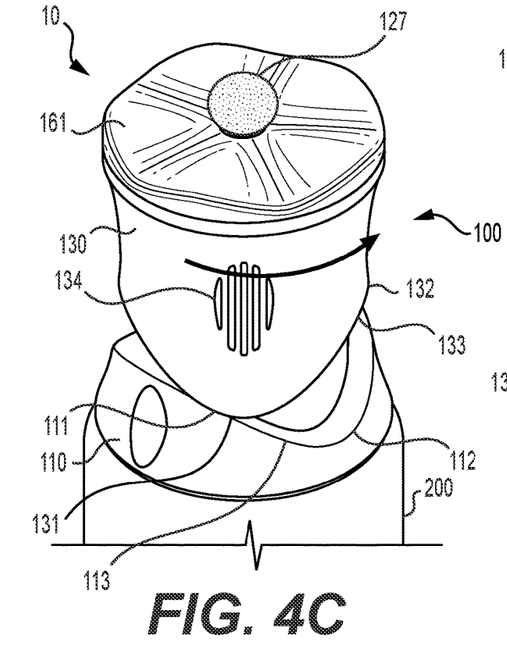
Figure 4D:
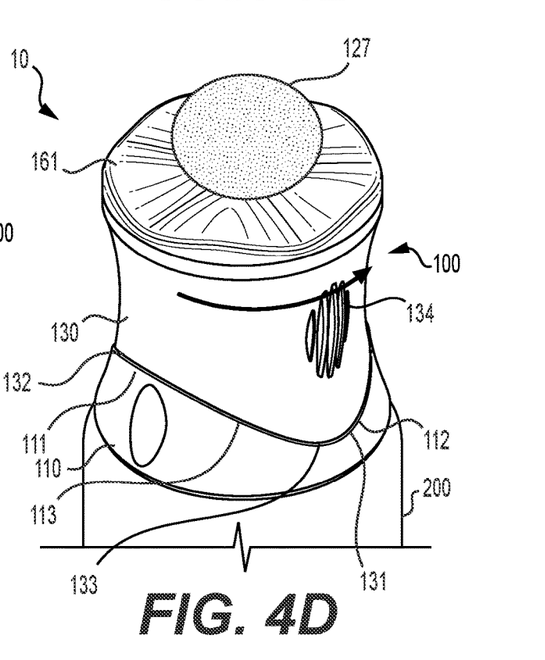

FIGS. 4C and 4D illustrate the dispensing portion of the operational cycle. FIG. 4C illustrates a third step of the operation cycle, whereby the outer portion 130 is rotated an additional about 45° relative to the vertical axis for a total of about 135° from the initial position. During this rotation, the outer portion 130 begins to descend as the bottom surface 133 of the outer portion 130 moves downs the wave of the top surface 113 of the skirt 110. FIG. 4D illustrates a fourth step of the operational cycle, whereby the outer portion 130 is rotated an additional about 45° relative to the vertical axis for a total of 180° from the initial position. At the completion of this rotation, the operational cycle is complete, and the outer portion 130 is back in the initial position with the protrusions 131 of the outer portion provided in the low portions 112 of the skirt 110 and the high portions 111 of the skirt 110 provided in the recesses 132 of the outer portion 130.

In an embodiment, the entire operational cycle can be performed in a single smooth rotational motion by a user. Multiple operational cycles can be performed immediately in secession. In another embodiment, each step of the operational cycle may be distinct and separate steps performed in sequence.

The inner portion 120 is fixed and does not move or rotate during the operational cycle. In an embodiment, the inner portion 120 may include at least one anti-rotation notch that corresponds with at least one anti-rotation notch on the container 200. In a preferred embodiment, 4 anti-rotation notches may be provided on the inner portion 120 and 4 corresponding anti-rotation notches may be provided on the container 200. The anti-rotation notches of the container 200 and the anti-rotation notches of the inner portion 120 create a mechanical stop to prevent the inner portion 120 from rotating during operation of the dosing cap.

Figure 5:
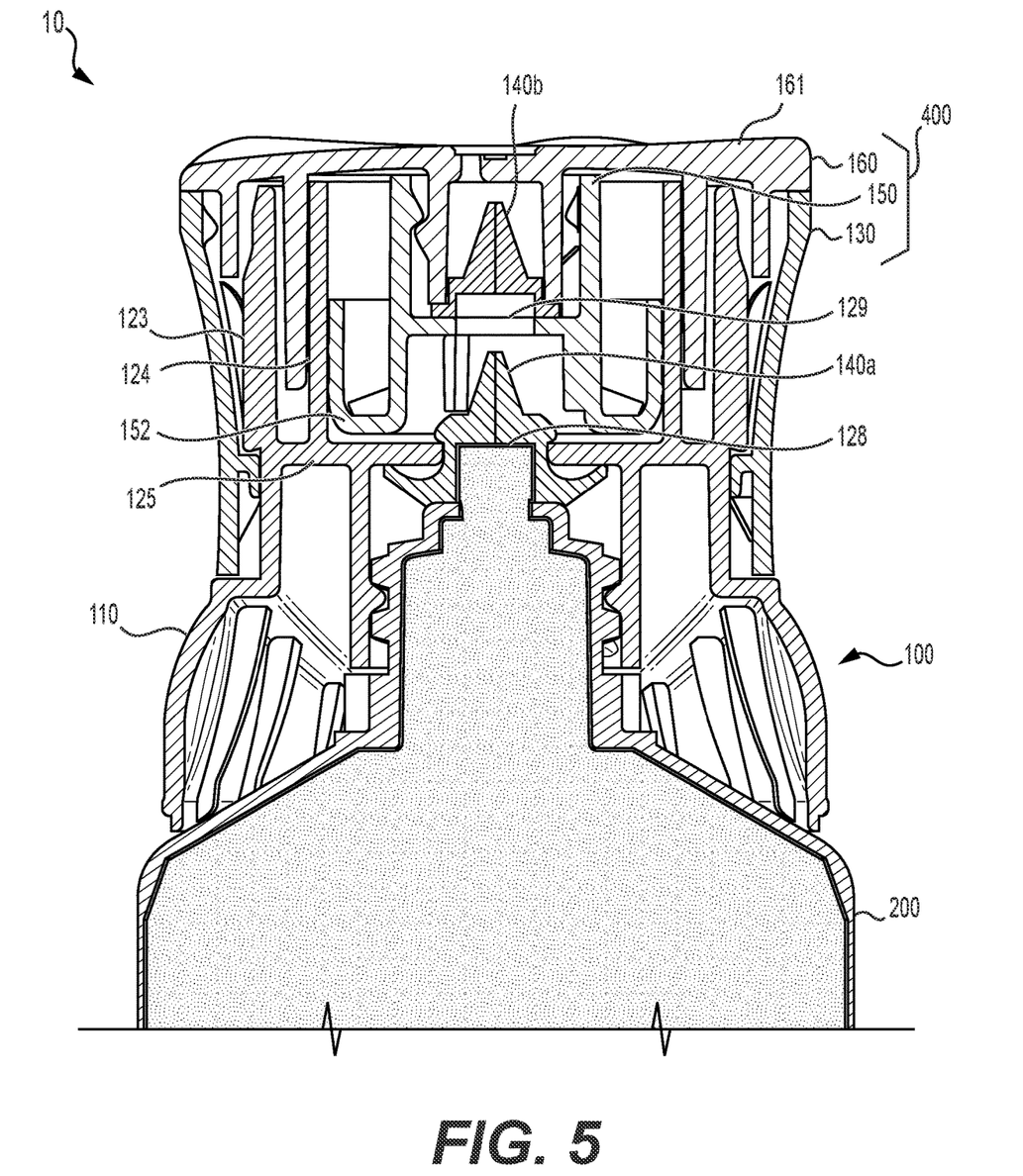
FIG. 5 is a cross-sectional view of the dosing device in an initial position according to an embodiment.

FIG. 5 illustrates a cross-sectional view of the dosing device 10 in the initial position. The inner portion 120 comprises an exterior wall 123, an interior wall 124, and a bottom surface 125. The interior wall 124 may be provided within the exterior wall 123. In an embodiment, there may be a gap between the interior wall 124 and the exterior wall 123. The bottom surface 125 of the inner portion 120 is a horizontal surface.

The dosing cap 100 includes a flow conduit through it for the flow of contents in a flow direction out of the container 200 during the operational cycle. The flow conduit comprises an inlet end to allow contents from the container 200 to flow into the dosing cap 100, and an outlet to allow contents to flow from the dosing cap 100 out of the orifice 162 on to the applicator surface 161.

The bottom surface 125 of the inner portion 120 includes a bottom opening 128 which constitutes the inlet end of the flow conduit and allows contents to flow up from the container 200. The bottom valve 104a is provided over the bottom opening 128 and alternates between the open position and the closed position to control the flow of contents 127 during the operational cycle. The bottom valve 140a may further include flange portions provided on either side of the bottom valve 140a. The bottom valve 140a is in the closed position when the dosing device 10 is in the initial position.

The piston 150 is provided inside of the interior wall 124 of the inner portion 120 such that the bottom portion 152 of the piston 150 is provided on top of the bottom surface 125 of the inner portion 120. In an embodiment, the piston creates an airtight seal with the interior wall 124 of the inner portion 120. In the initial position, there is substantially little or no space between the piston 150 and the bottom surface 125 of the inner portion 120. The piston 150 includes a top opening 129 which constitutes the outlet end of the flow conduit. The top valve 140b is provided over the top opening and alternates between the open position and the closed position to control the flow of contents out of the dosing cap 100 during the operational cycle. The top valve 140b may further include flange portions provided on either side of the top valve 140b. The top valve 140b is in the closed position when the dosing device 10 is in the initial position.

Figure 6A:
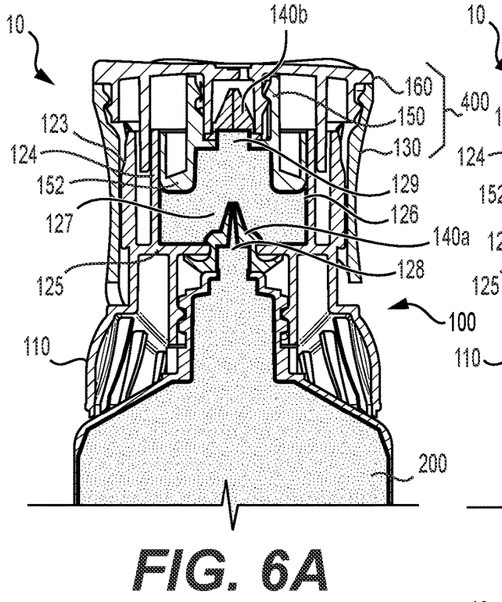
FIGS. 6A-6D illustrate a cross-sectional view of an exemplary operational cycle of the dosing device according to an embodiment.
Figure 6B:
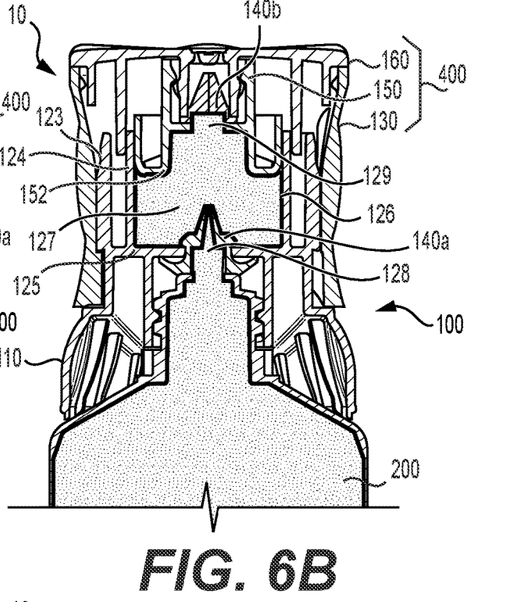

FIGS. 6A to 6D illustrate a cross-sectional view of an exemplary operational cycle of the dosing device 10. FIGS. 6A and 6B illustrate the filling portion of the operational cycle. During the filling portion of the operational cycle, the moveable member 400 moves up in the vertical direction as the outer portion 130 is rotated during the first step and the second step of the operational cycle. The movement of the piston 150 upwards as part of the moveable member creates a volume accumulation chamber 126 between the bottom portion 152 of the piston 150 and the bottom surface 125 of the inner portion 120. The volume accumulation chamber 126 is a vacuum. The movement of the piston causes contents 127 to flow from the container 200 into the volume accumulation chamber 126 via the bottom opening 128. The size of the volume accumulation 126 chamber increases relative to the vertical movement of the piston 150 as the outer portion 130 is rotated during the operational cycle.

The increase in the size of the volume accumulation chamber 126 creates a low pressure zone in the volume accumulation chamber 126 causing the bottom valve 140a to move to the open position to allow contents held in the container 200 to be pulled into the volume accumulation chamber 126 via the bottom opening 128. The top valve 140b remains in the closed position during the filling portion of the operational cycle. At the completion of the filling portion of the operational cycle, the outer portion 130 is in the extended position, and the volume accumulation chamber 126 is at its maximum capacity and filled completely with contents 127. As the pressure of the container 200 and the pressure of the volume accumulation chamber 126 reach equilibrium, the bottom valve 140a moves into the closed position.

The size of the volume accumulation chamber 126 and the amount of contents 127 that can be held in the volume accumulation chamber 126 corresponds to the amount of contents 127 required for one dose. The size of the volume accumulation chamber 126 is a factor of the height and diameter of the volume accumulation chamber 126, both of which may be independently modified or controlled to adjust the amount of contents 127 to be dispensed. The height of the volume accumulation chamber 126 may be controlled by the vertical movement of the piston 150, and the diameter of the volume accumulation chamber 126 may be controlled by the arrangement and spacing of the exterior wall 123 and interior wall 124 of the inner portion 120 and the piston 150. This allows the dosing cap 100 to be customizable to fit with any container 200 and dispense any amount of contents 127 that may be required.

Figures 6C, 6D:
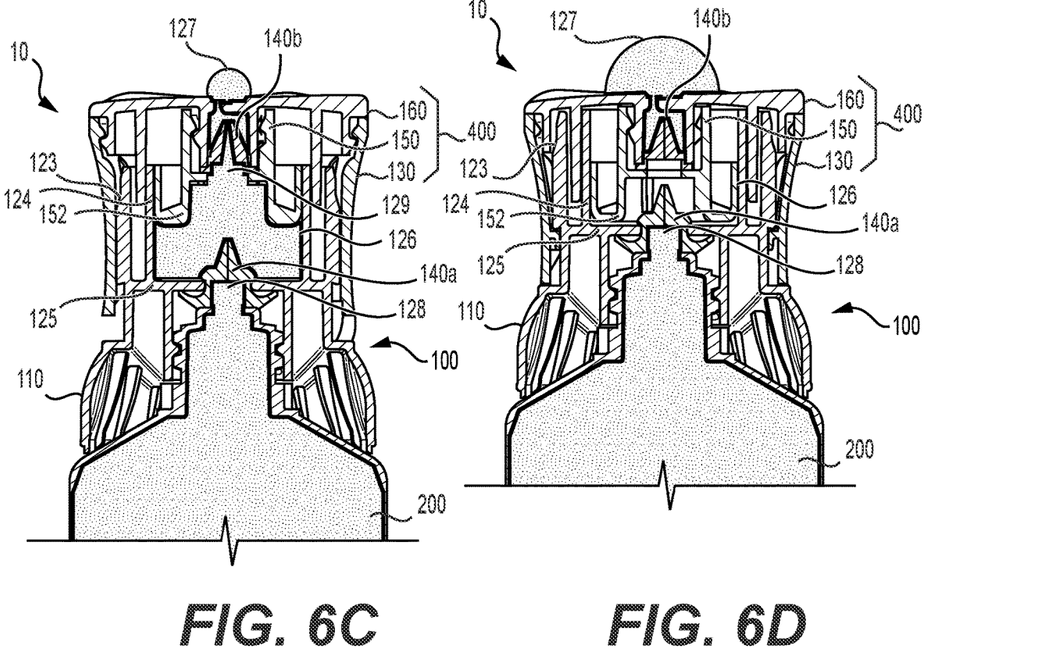

FIGS. 6C and 6D illustrate a cross-sectional view of the dispensing portion of the operational cycle. The bottom valve 140a remains in the closed position, and the top valve 140b is in the open position due to an increase in pressure in the volume accumulation chamber 126. During the dispensing portion, the moveable member descends and lowers in height in the vertical direction as the outer portion 130 continues to be rotated in the third step and the fourth step of the operational cycle. The downward movement of the piston 150 as part of the moveable member 400 decreases the size of the volume accumulation chamber 126, and the contents 127 held in the volume accumulation chamber 126 are forced out of the top opening 129 and out of the orifice 162 by the pressure applied to the contents 127 by the piston 150 as it occupies the space of the volume accumulation chamber 126 and returns to the initial position.

At the end of the dispensing portion of the operational cycle, the volume accumulation chamber 126 is back to its original size and all of the contents 127 pulled into the volume accumulation chamber 126 from the container 200 during the filling portion have been dispensed out of the orifice 162 and are on the applicator surface 161 ready for use. The top valve 140b and the bottom valve 140a are both in the closed position at the end of the operational cycle and the dosing cap 200 is back in the initial position and ready for another operational cycle. The dispensed contents 127 are ready for use by the user on the applicator surface 161 and may be applied to the desired area using a finger or by using the applicator surface 161 as an applicator to directly apply the contents 127 to the desired area.

During each operation cycle, the amount of contents 127 dispensed is the same because the volume accumulation chamber 126 increases by the same amount and a consistent amount of contents 127 fills the volume accumulation chamber 126. Therefore, a predetermined, reliable and consistent dose of contents 127 can be dispensed from the dosing cap 100 for the user with each operational cycle. This prevents waste of contents 127 and allows the user to have access to the appropriate dose of contents 127. In an embodiment, the amount of contents 127 dispensed is between about 0.5 grams and about 5 grams. In another embodiment, the amount of contents 127 dispensed is between about 1 gram and about 3 grams. In a preferred embodiment, the amount of contents 127 dispensed is about 2 grams. The amount of contents 127 is not limited and may be modified by adjusting the height and diameter of the volume accumulation chamber 126 to be suitable for the specific contents held in the container 200.

The dosing cap 100 may be compatible with any container 200 so as to transform any container 200 into a dosing device 10 with the ability to dose appropriate and predetermined amounts of contents form the container 200. This allows stock containers to be equipped with the dosing cap 100 according to aspects of the present invention to provide a cost effective, fast and easily adaptable solution.

The dosing device 10 may include a tamper-proof mechanism to prevent tampering with the contents 127 and to maintain the safety and efficacy of the contents 127 held in the container 200. The tamper-proof mechanism may be a tamper band connecting the outer portion 130 and the inner portion 120 or the outer portion 130 and the skirt 110 such that any rotation of the outer portion 130 to engage the dosing cap 100 would result in the tamper brand breaking. The broken tamper band may serve as visible evidence to a user that the contents 127 may have been tampered with and/or previously accessed. In an embodiment, there may be two tamper bands provided on opposing sides of the dosing cap 100. The outer portion 130 may not be rotated without breaking either one or both tamper bands.

FIGS. 7-9D illustrate a dosing device 50 including a container 200 and dosing cap 500 according to a second embodiment of the present invention. The outer functionality, operational cycle and the user's interaction with the dosing device 50 according to the second embodiment is substantially the same as the dosing device 10 described above.

Figure 7:
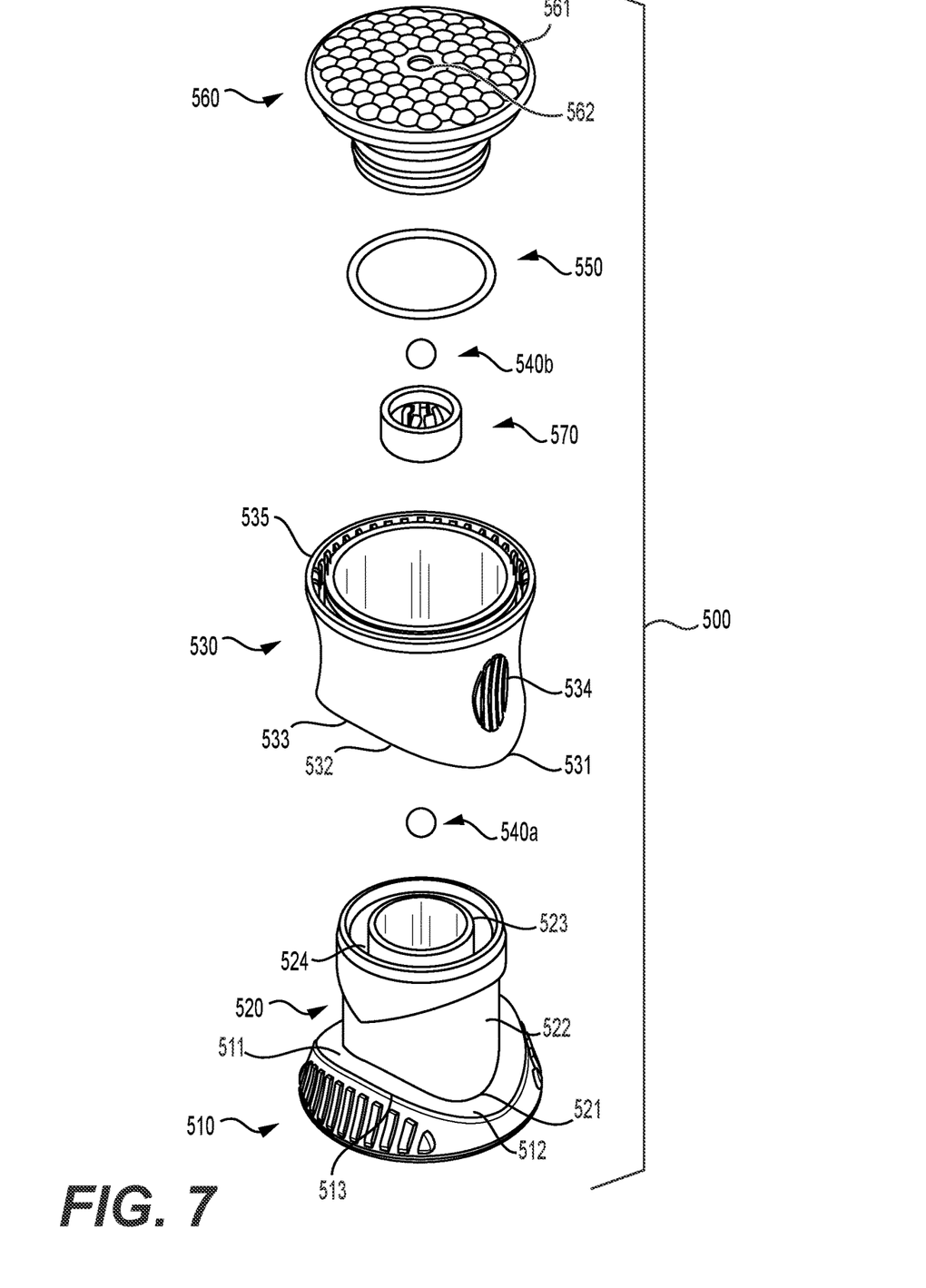
FIG. 7 is an exploded view of a dosing cap according to a second embodiment.

FIG. 7 illustrates an exploded view of the dosing cap 500 according to the second embodiment. The dosing cap 500 includes an inner portion 520, a skirt 510, an outer portion 530, a head cover 560, a bottom valve 540a, a top valve 540b, a gasket 550, and a cage 570. The construction and operation of the inner portion 520, skirt 510, outer portion 530 and head cover 560 is substantially analogous in functionality and appearance to the dosing cap 100 described above.

In an embodiment, the bottom valve 540a and the top valve 540b may be spherical. In an embodiment, the bottom valve 540a and the top valve 540b may be made from steel, glass, plastic, or a combination thereof. The bottom valve 540a and the top valve 540b may alternate between an open position and a closed position to control the flow of contents during an operational cycle.

In an embodiment, the gasket 550 may be in the shape of a ring. The gasket 550 may be made from rubber, steel, glass, plastic, or a combination thereof. The gasket 550 and the cage 570 are connected to the head cover 560, which is connected to the outer portion 530. The outer portion 530, head cover 560, gasket 550, and cage 570 are all operably connected and constitute a moveable member.

Figure 8:
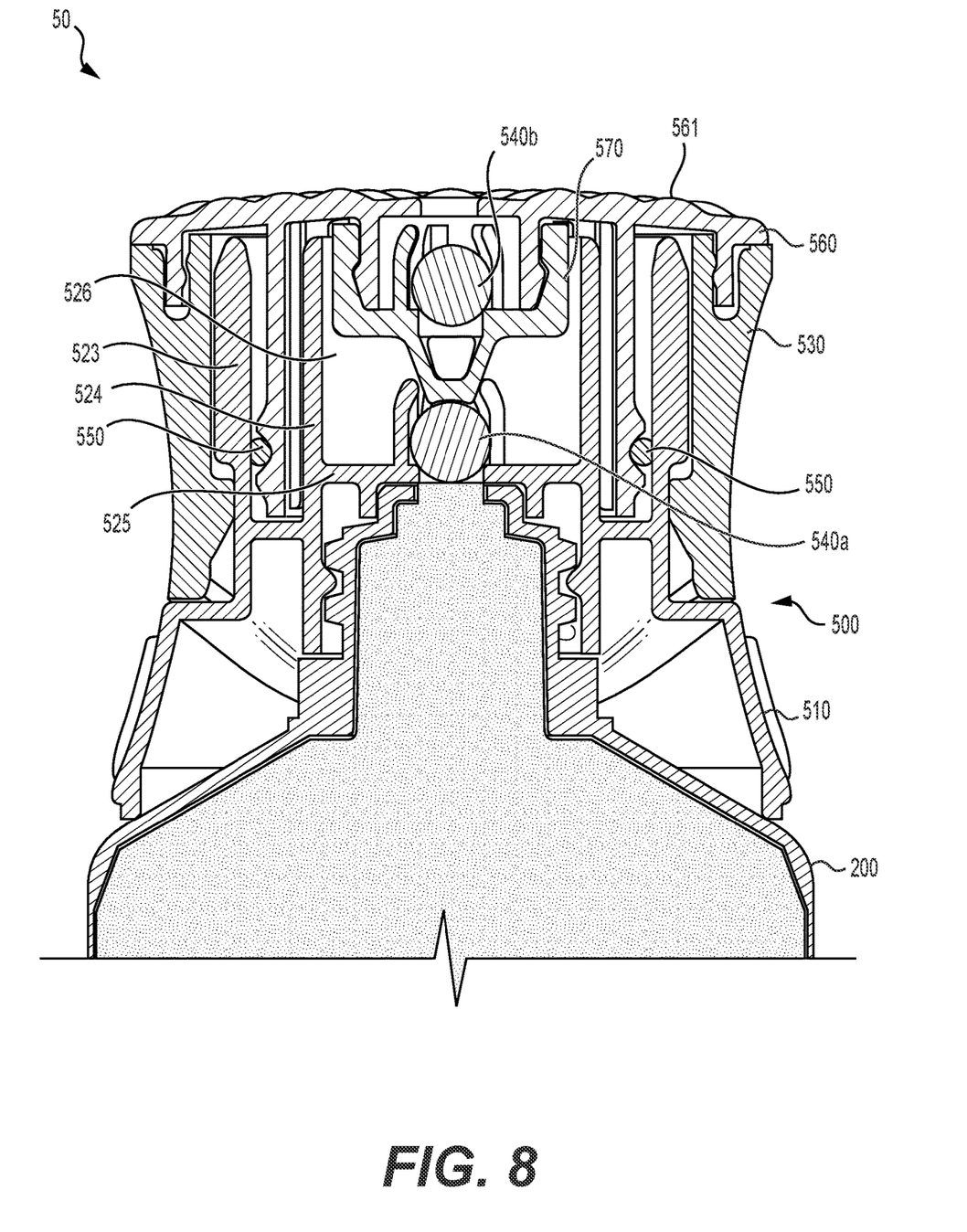
FIG. 8 is a cross-sectional view of a dosing device in an initial position according to the second embodiment.

FIG. 8 illustrates a cross sectional view of the dosing device 50 in an initial position according to the second embodiment. The gasket 550 is provided around the dosing cap 500. A volume accumulation chamber 526 is created between the bottom surface 525 of the inner portion 520 and the cage 570. Since the gasket 550 is located outside of a volume accumulation chamber 526, it does not come into contact with the contents 527 that may be drawn from the container in to the volume accumulation chamber 526. Therefore, there is more flexibility as to the materials that may be used for the gasket 550 since the gasket will not affect the stability or other characteristics the contents 527. The gasket 550 creates an airtight seal around the dosing cap 500, creating a vacuum in the volume accumulation chamber 526 in order to draw contents 527 up from the container 200 into the volume accumulation chamber 526 with the rotation of the outer portion 530 during the operational cycle.

The top valve 540b is held in the cage 570. The bottom of the cage 570 is provided over the top of the bottom valve 540a in the initial position to hold the bottom valve 540a in place over a bottom opening 528. The top valve 540b and the bottom valve 540a may be one-way valves, two-way valves or a combination. The top valve 540b and the bottom valve 540a are in the closed position in the initial position.

Figure 9A:
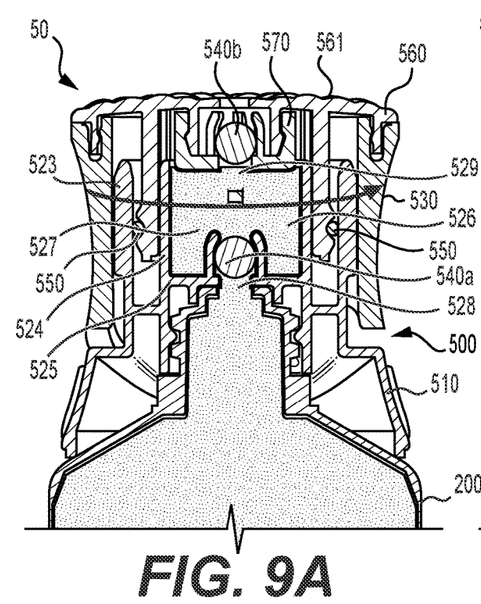
FIGS. 9A-9D illustrate a cross-sectional view of an exemplary operational cycle of the dosing device according to a second embodiment.
Figure 9B:
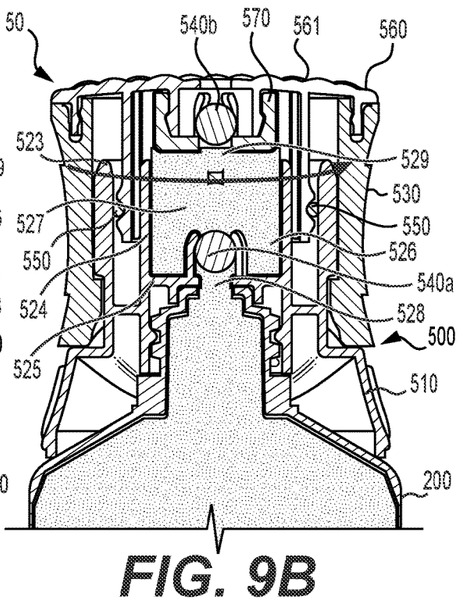

FIGS. 9A to 9D illustrate a cross-sectional view of the operational cycle of the dosing device 50 according to the second embodiment. FIGS. 9A and 9B illustrate a cross-sectional view of a filling portion of the operational cycle according to the second embodiment. During the filling portion, the moveable member moves up in the vertical direction as the outer portion 530 is rotated. The movement of the cage 570 upwards as part of the moveable member creates the volume accumulation chamber 526 and allows the bottom valve 540a to move from over the bottom opening 528 and be in the open position so that contents 527 may be drawn up into the volume accumulation chamber 526. The top valve 540b remains in the closed position.

Figures 9C, 9D:
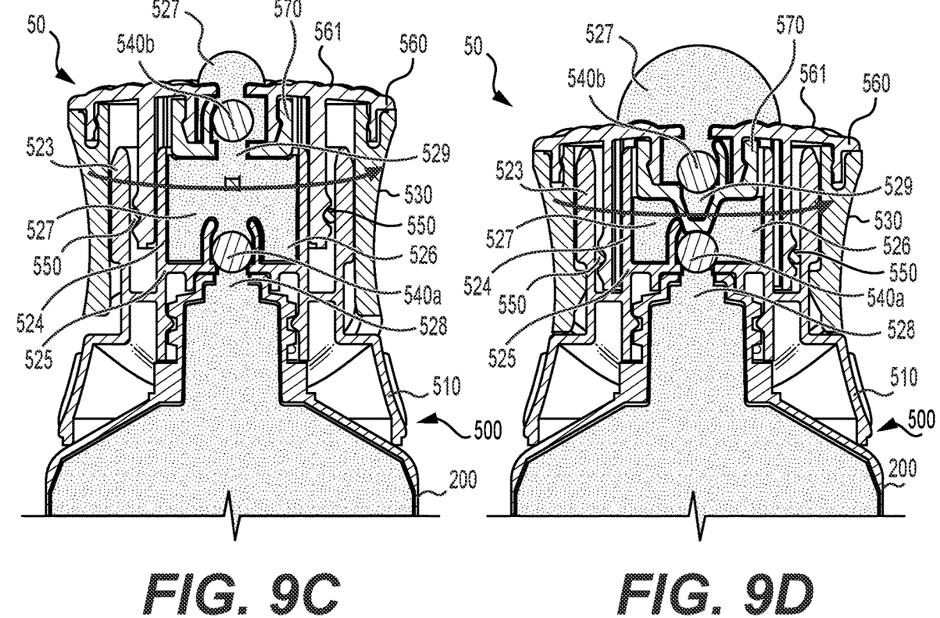

FIGS. 9C and 9D illustrate a cross-sectional view of a dispensing portion of the operational cycle according to the second embodiment. The top valve 540b is in the open position. During the dispensing portion of the operational cycle, the moveable member descends and lowers in height in the vertical direction. The downward movement of the cage 570 as part of the moveable member decreases the size of the volume accumulation chamber 526 and the contents 527 held in the volume accumulation chamber 526 are forced out of a top opening 529 and out of the orifice. At the end of the dispensing portion of the operational cycle, the volume accumulation chamber 526 is back to its original size and all of the contents 527 pulled into the volume accumulation chamber 526 from the container 200 during the filling portion have been dispensed. The top valve 540b and the bottom valve 540a are both in the closed position and the dosing device 50 back in the initial position.

In an embodiment of the present invention, the contents 127, 527 may be in various forms and selected from group comprising gel, lotion, cream, oil, emulsion, ointment and powder. In an embodiment, the contents may be viscous. In an embodiment, the contents may have a viscosity between about 1.5 Pa·s and about 4 Pa·s. In a preferred embodiment, the contents may have a viscosity between about 1.8 Pa·s and about 3.3 Pa·s. In an embodiment, the contents 127, 527 held in the container 200 is a cream or gel containing diclofenac sodium. In a preferred embodiment, the contents 127, 527 held in the container 200 is a combination of diclofenac sodium, ammonia, carbomer homopolymer type c, coco-caprylate/caprate, isopropyl alcohol, mineral oil, polyoxyl 20 cetostearyl ether, propylene glycol, and water.

Although the invention has been explained in relation to its preferred embodiment(s), it is to be understood that many other possible modifications and variations can be made without departing from the scope of the present invention.

What is claimed is:

1. A dosing device comprising:
    a container having a top longitudinal end, a bottom longitudinal end, and a side wall, the top longitudinal end providing access to a cavity wherein contents can be held; and
    a dosing cap comprising:
    an inner portion provided over the top longitudinal end of the container, wherein the inner portion includes an interior wall, an exterior wall, and a bottom surface;
    a piston provided within the interior wall of the inner portion, wherein a bottom portion of the piston is provided on top of the bottom surface of the inner portion;
    a skirt provided on an outer surface of the inner portion, wherein a top surface of the skirt comprises one or more high portions and one or more low portions;
    an outer portion rotatably coupled with the outer surface of the inner portion, wherein a bottom surface of the outer portion comprises one or more protrusions and one or more recesses, and wherein the outer portion is provided above the skirt along a vertical axis; and
    a head cover provided over a top surface of the outer portion, the head cover comprising an applicator surface and at least one orifice, wherein the head cover is operably connected to the outer portion and the piston, and wherein the head cover, the outer portion, and the piston constitute a moveable member,
    wherein the outer portion is rotated during an operational cycle from an initial position, to an extended position, and back to the initial position to dispense contents from the container, and wherein the rotation of the outer portion from the initial position to the extended position constitutes a filling portion of the operational cycle and the rotation of the outer portion from the extended position back to the initial position constitutes a dispensing portion of the operational cycle.

2. The dosing device of claim 1, wherein the outer portion comprises two protrusions and two recesses arranged in an alternating order around the outer portion.

3. The dosing device of claim 1, wherein the skirt comprises two high portions and two low portions arranged in an alternating order around the skirt.

4. The dosing device of claim 1, wherein a complete operational cycle includes rotating the outer portion 180° relative to the vertical axis, whereby the first 90° rotation is the filling portion of the operational cycle and the subsequent 90° rotation is the dispensing portion of the operational cycle.

5. The dosing device of claim 1, wherein in the initial position, the high portions of the skirt are provided in the recesses of the outer portion and the protrusions of the outer portion are provided in the low portions of the skirt, whereby the bottom surface of the outer portion is substantially flush against the top surface of the skirt.

6. The dosing device of claim 1, wherein in the extended position, the protrusions of the outer portion are provided over the high portions of the of the skirt and the recesses of the outer portion are provided over the low portions of the skirt, whereby the outer portion is extended upwards from the initial position.

7. The dosing device of claim 1, wherein during the filling portion of the operational cycle, the moveable member moves up in the vertical direction creating a volume accumulation chamber between the piston and the bottom surface of the inner portion, wherein the volume accumulation chamber is a vacuum, and wherein contents are drawn from the container into the volume accumulation chamber.

8. The dosing device of claim 7, wherein during the dispensing portion of the operational cycle, the moveable member moves down in the vertical direction and the piston occupies the space of the volume accumulation chamber, whereby contents are forced out of the volume accumulation chamber and dispensed out of the orifice.

9. The dosing device of claim 1, wherein between about 0.5 grams and about 5 grams of contents are dispensed from the dosing device with each operational cycle.

10. A method of dispensing a consistent and predetermined dose of contents, comprising using the dosing device according to claim 1.

11. A dosing cap comprising:
    an inner portion provided over a cavity of a container, wherein contents may be held in the cavity, and wherein the inner portion includes an interior wall, an exterior wall, and a bottom surface;
    a piston provided within the interior wall of the inner portion, wherein a bottom surface of the piston is provided on top of the bottom surface of the inner portion;
    a skirt provided on an outer surface of the inner portion, wherein a top surface of the skirt comprises at least one high portion and at least one low portion;
    an outer portion rotatably coupled with the outer surface of the inner portion, wherein a bottom surface of the outer portion comprises at least one protrusion and at least one recess, and wherein the outer portion is provided above the skirt along a vertical axis; and
    a head cover provided over a top surface of the outer portion, the head cover comprising an applicator surface and at least one orifice, wherein the head cover is operably connected to the outer portion and the piston, and wherein the head cover, the outer portion, and the piston constitute a moveable member,
    wherein the outer portion is rotated during an operational cycle from an initial position, to an extended position, and back to the initial position to dispense contents from the container, and wherein the rotation of the outer portion from the initial position to the extended position constitutes a filling portion of the operational cycle and the rotation of the outer portion from the extended position back to the initial position constitutes a dispensing portion of the operational cycle.

* * * * *